(12) United States Patent
Cho et al.

(10) Patent No.: US 10,490,841 B2
(45) Date of Patent: Nov. 26, 2019

(54) SECONDARY BATTERY

(71) Applicant: Samsung SDI Co., Ltd., Yongin-si, Gyeonggi-do (KR)

(72) Inventors: Kyunghoon Cho, Yongin-si (KR); Jeawoan Lee, Yongin-si (KR); Youngchang Lim, Yongin-si (KR); Soomi Eo, Yongin-si (KR); Seunghee Park, Yongin-si (KR); Jaemin Lim, Yongin-si (KR); Kwonchul Kim, Yongin-si (KR); Euysun Jung, Yongin-si (KR); Kyung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 295 days.

(21) Appl. No.: 15/336,737

(22) Filed: Oct. 27, 2016

(65) Prior Publication Data

US 2017/0141427 A1    May 18, 2017

(30) Foreign Application Priority Data

Nov. 12, 2015   (KR) .................. 10-2015-0159046

(51) Int. Cl.
| | |
|---|---|
| *H01M 10/02* | (2006.01) |
| *H01M 10/04* | (2006.01) |
| *H01M 2/02* | (2006.01) |
| *H01M 2/10* | (2006.01) |
| *H01M 4/04* | (2006.01) |

(52) U.S. Cl.
CPC ..... *H01M 10/0431* (2013.01); *H01M 2/0267* (2013.01); *H01M 2/1094* (2013.01); *H01M 4/0404* (2013.01); *H01M 10/02* (2013.01); *H01M 2200/00* (2013.01)

(58) Field of Classification Search
CPC ........... H01M 10/0431; H01M 2/0267; H01M 4/0404; H01M 2/1094; H01M 10/02; H01M 2200/00
See application file for complete search history.

(56) References Cited

U.S. PATENT DOCUMENTS

| | | | | |
|---|---|---|---|---|
| 2001/0041288 A1* | 11/2001 | Onishi | ................. | H01M 2/266 429/161 |
| 2006/0154138 A1* | 7/2006 | Miyamoto | .......... | H01M 2/0257 429/130 |
| 2010/0310912 A1* | 12/2010 | Kim | ................. | H01M 10/0431 429/94 |

(Continued)

FOREIGN PATENT DOCUMENTS

| | | |
|---|---|---|
| KR | 2011-0034313 A | 4/2011 |
| KR | 2011-0127830 A | 11/2011 |

(Continued)

*Primary Examiner* — Muhammad S Siddiquee
(74) *Attorney, Agent, or Firm* — Lewis Roca Rothgerber Christie LLP (57) ABSTRACT

A secondary battery includes: a wound electrode assembly including a first electrode plate, a second electrode plate, and a separator between the first electrode plate and the second electrode plate; a pouch accommodating the electrode assembly; and; an adhesive tape on an outer surface of the electrode assembly. The adhesive having adhesiveness through reaction with an electrolyte.

10 Claims, 4 Drawing Sheets

(56) References Cited

U.S. PATENT DOCUMENTS

| | | | |
|---|---|---|---|
| 2011/0076533 A1* | 3/2011 | Choi | H01M 2/0426 429/94 |
| 2011/0300361 A1* | 12/2011 | Nakayama | C09J 7/29 428/220 |
| 2015/0171383 A1* | 6/2015 | Ahn | H01M 2/1686 429/94 |

FOREIGN PATENT DOCUMENTS

| | | |
|---|---|---|
| KR | 2012-0035090 A | 4/2012 |
| KR | 2015-0069837 A | 6/2015 |

\* cited by examiner

SECONDARY BATTERY

CROSS-REFERENCE TO RELATED APPLICATION

This application claims priority to and the benefit of Korean Patent Application No. 10-2015-0159046, filed on Nov. 12, 2015 in the Korean Intellectual Property Office, the contents of which are incorporated by reference herein in their entirety.

BACKGROUND

1. Field

Embodiments of the present invention relate to a secondary battery

2. Description of the Related Art

Secondary batteries are rechargeable batteries that are designed to be repeatedly charged and discharged, unlike primary batteries that are not designed to be recharged. A small-capacity rechargeable battery having a single pack electrode assembly is used in small portable electronic devices, such as mobile phones, camcorders, and the like, while a large-capacity rechargeable battery having several tens of electrode assemblies connected to each other is widely used as a motor-driving power source, such as in an electric scooter, a hybrid vehicle, or an electric vehicle, or as a large-capacity power storage device.

Secondary batteries are manufactured in various shapes. For example, pouch-type batteries are typically used as batteries in electronic devices. Nowadays, the batteries for electronic devices are being developed to be slimmer and have higher capacities. Additionally, slimming of components of such batteries is ongoing.

However, slimmer, higher capacity batteries may not be as safe as larger, lower capacity batteries. For example, as batteries are becoming slimmer and capacities of the batteries increase, the batteries have become more vulnerable to impacts due to falling or collision and more vulnerable to compression, resulting in safety-related issues or concerns.

SUMMARY

Embodiments of the present invention provide a secondary battery which has improved drop safety and collision safety.

The above and other aspects of the present invention will be described in or will be apparent from the following description of exemplary embodiments.

According to an embodiment of the present invention, there is provided a secondary battery including a wound electrode assembly including a first electrode plate, a second electrode plate, and a separator between the first electrode plate and the second electrode plate, a pouch accommodating the electrode assembly, and an adhesive tape on an outer surface of the electrode assembly. The adhesive tape having adhesiveness through reaction with an electrolyte.

The adhesive tape may include an oriented polystyrene (OPS) film.

The adhesive tape may include a first adhesive tape on a top portion of the electrode assembly and a second adhesive tape on a bottom portion of the electrode assembly. The first adhesive tape may have a length that is one-third of the entire height of the electrode assembly and may extend from a top end of the electrode assembly toward a bottom end of the electrode assembly, and the second adhesive tape may have a length that is one-third of the entire height of the electrode assembly and may extend from the bottom end of the electrode assembly toward the top end of the electrode assembly.

The secondary battery may further include a strength reinforcing tape on the electrode assembly between the first adhesive tape and the second adhesive tape, and the strength reinforcing tape may include a polyimide (PI) film.

The electrode assembly may include a first planar portion and a second planar portion and a first round portion and a second round portion. Areas of each of the first and second planar portions may be greater than areas of each of the first and second round portions.

The adhesive tape may be on the first planar portion, the second round portion, and the second planar portion.

The adhesive tape may be on the first round portion and the second round portion.

The adhesive tape may extend from the first round portion onto the first planar portion and from the second round portion onto the second planar portion.

The adhesive tape may be on the first round portion, the first planar portion, and the second round portion.

The adhesive tape may be on the first planar portion, the second planar portion, the first round portion, and the second round portion.

As described above, in the secondary battery according to embodiments of the present invention, the electrode assembly may not move or may not substantially move within a pouch by attaching an adhesive tape, which reacts with an electrolyte to become adhesive, to top and bottom portions of the electrode assembly, thereby improving drop (or falling) safety of the secondary battery.

In addition, in the secondary battery according to embodiments of the present invention, the strength of the electrode assembly can be improved by attaching a strength reinforcing tape to a central portion of the electrode assembly, thereby improving collision safety of the secondary battery.

BRIEF DESCRIPTION OF THE DRAWINGS

The above and other features and aspects of the present invention will become more apparent by describing, in detail, exemplary embodiments thereof with reference to the attached drawings, in which.

DETAILED DESCRIPTION

Hereinafter, examples of embodiments of the present invention will be described, in detail, with reference to the accompanying drawings such that they can easily be made and used by those skilled in the art.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 1:
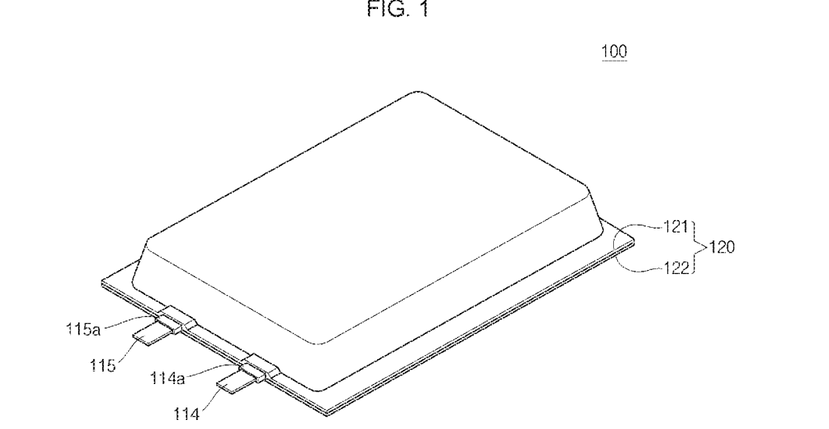
FIG. 1 is a perspective view of a secondary battery according to an embodiment of the present invention.
Figure 2:
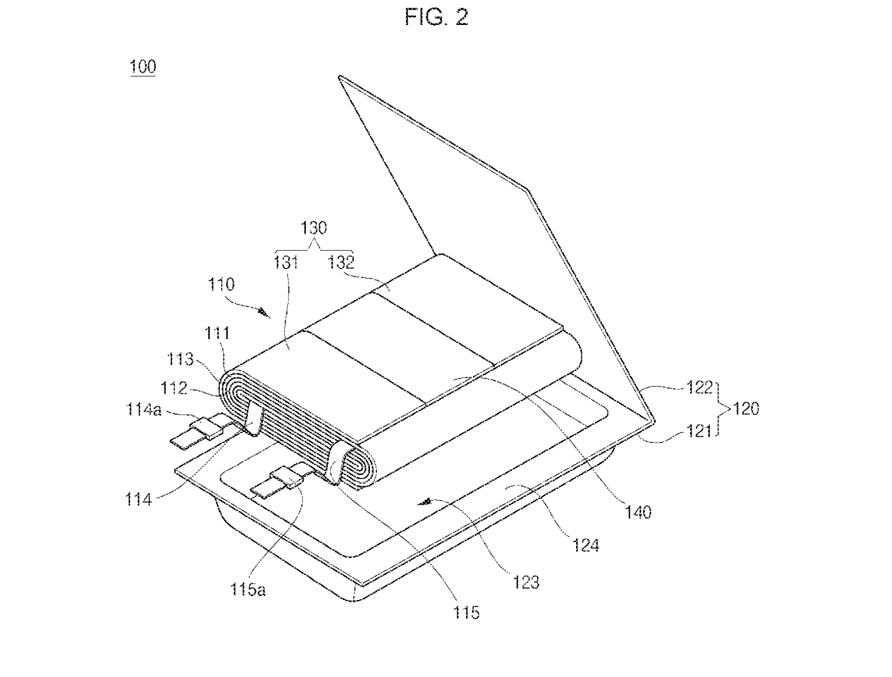
FIG. 2 is an exploded perspective view of the secondary battery illustrated in FIG. 1.
Figure 3:
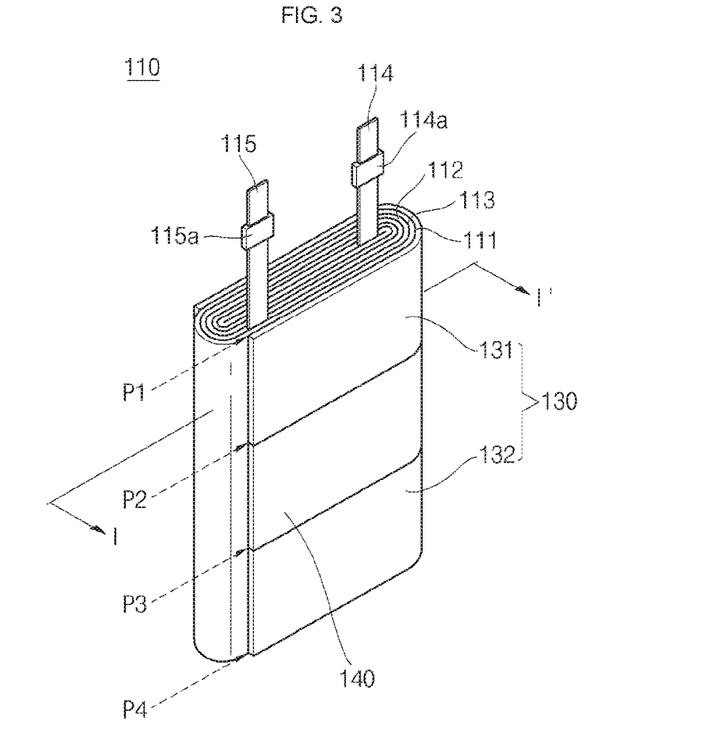
FIG. 3 is a perspective view of an electrode assembly according to an embodiment of the present invention.
Figure 4:
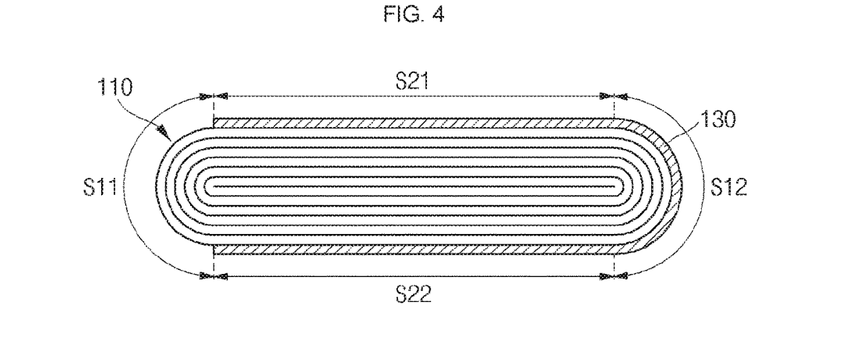
FIG. 4 is a cross-sectional view of the electrode assembly taken along the line I-I' in FIG. 3.

FIG. 1 is a perspective view of a secondary battery according to an embodiment of the present invention, FIG. 2 is an exploded perspective view of the secondary battery illustrated in FIG. 1, FIG. 3 is a perspective view of an electrode assembly according to an embodiment of the present invention, and FIG. 4 is a cross-sectional view of the electrode assembly illustrated in FIG. 3.

Referring to FIGS. 1-4, a secondary battery 100 according to an embodiment of the present invention includes an electrode assembly 110, a pouch 120, an adhesive tape 130, and a strength reinforcing tape 140.

The electrode assembly 110 includes a first electrode plate 111, a second electrode plate 112, and a separator 113 interposed between the first electrode plate 111 and the second electrode plate 112. The electrode assembly 110 is formed by winding a stacked structure of the first electrode plate 111, the separator 113 and the second electrode plate 112 in a jelly-roll configuration. In one embodiment, the first electrode plate 111 may function as a positive electrode, and the second electrode plate 112 may function as a negative electrode. However, the present invention is not limited thereto, and the polarities of the first and second electrode plates 111 and 112 may be reversed from those discussed above.

The first electrode plate 111 is formed by coating a first electrode active material, such as a transition metal oxide, on a first electrode current collector including (e.g., made of) a metal foil, such as an aluminum (Al) foil. A first electrode tab 114 is attached to the first electrode plate 111. One end of the first electrode tab 114 is connected to (e.g., electrically connected to) the first electrode plate 111, and the other end of the first electrode tab 114 protrudes upwardly from (e.g., away from) the electrode assembly 110. An insulation member 114a (e.g., an insulator or an insulation tape) is attached to the first electrode tab 114. The insulation member 114a prevents an electric short between the pouch 120 and the first electrode tab 114.

The second electrode plate 112 is formed by coating a second electrode active material, such as graphite or carbon, on a second electrode current collector including (e.g., made of) a metal foil, such as a copper (Cu) or nickel (Ni) foil. A second electrode tab 115 is attached to the second electrode plate 112. One end of the second electrode tab 115 is connected to (e.g., electrically connected to) the second electrode plate 112, and the other end of the second electrode tab 115 protrudes upwardly from (e.g., away from) the electrode assembly 110, An insulation member 115a (e.g., an insulator or an insulation tape) is attached to the second electrode tab 115. The insulation member 115a prevents an electric short between the pouch 120 and the second electrode tab 115.

The separator 113 is positioned between the first electrode plate 111 and the second electrode plate 112 and prevents an electric short therebetween. The separator 113 allows lithium ions to move (e.g., to move between the first and second electrode plates 111 and 112) and may be formed of a film including (e.g., made of) polyethylene or polypropylene or may be a composite film including polyethylene and polypropylene.

The electrode assembly 110 is substantially accommodated within the pouch 120 together with an electrolyte. The electrolyte may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. The electrolyte may be a liquid, solid, or gel.

In addition, the electrode assembly 110 includes planar portions S21 and S22 at which the first electrode plate 111 and the second electrode plate 112 are flatly wound and round portions S11 and S12 at which the first electrode plate 111 and the second electrode plate 112 are curvedly wound. The round portions S11 and S12 include a first round portion S11 positioned at one side of the electrode assembly 110 and a second round portion S12 positioned at the other side (e.g., the opposite side) of the electrode assembly 110. In addition, the planar portions S21 and S22 include a first planar portion S21 and a second planar portion S22 positioned between (e.g., extending between) the first round portion S11 and the second round portion S12 and facing each other with respect to (e.g., at opposite sides of) the electrode assembly 110. In one embodiment, the first and second round portions S11 and S12 and the first and second planar portions S21 and S22 may form outermost portions or surfaces of the electrode assembly 110, and the first and second round portions S11 and S12 and the first and second planar portions S21 and S22 may together form the periphery of the electrode assembly 110. In addition, the first and second round portions S11 and S12 may correspond to short side surfaces of the electrode assembly 110, which have relatively small areas, and the first and second planar portions S21 and S22 may correspond to long side surfaces of the electrode assembly 110, which have relatively large areas.

The pouch 120 includes a first pouch layer 121 (e.g., a first pouch) for accommodating the electrode assembly 110 and a second pouch layer 122 (e.g., a second pouch) coupled to the first pouch layer 121. The pouch 120 is an integrally formed rectangular pouch layer, and the first pouch layer 121 and the second pouch layer 122 are joined together by the pouch 120 being folded in half in a lengthwise direction thereof. In addition, the first pouch layer 121 includes an accommodation groove 123 formed by pressing the first pouch layer 121 to accommodate the electrode assembly 110 and a sealing part 124 (e.g., a sealing portion) to be sealed with the second pouch layer 122. The first electrode tab 114 and the second electrode tab 115 protrude outside of the pouch 120 through the sealing part 124. In this embodiment, the insulation tapes 114a and 115a, respectively attached to the first electrode tab 114 and the second electrode tab 115, are brought into contact with the sealing part 124.

Because the pouch and the electrode assembly are spaced from each other, the electrode assembly may move within the pouch during a falling test that evaluates performance of the secondary battery. Accordingly, edges of the electrode assembly or electrode tabs are liable to cause an internal short circuit. Therefore, according to embodiments of the present invention, the electrode assembly 110 does not move or does not substantially move within the pouch 120 due to the adhesive tape 130, which becomes adhesive when it is exposed to (e.g., reacts with) the electrolyte, thereby improving the safety of the secondary battery 100.

The adhesive tape 130 is attached to (e.g., wraps around) the outer surface of the electrode assembly 110. The adhesive tape 130 fixes or adheres the electrode assembly 110 to the pouch 120, thereby preventing or substantially reducing movement of the electrode assembly 110 within the pouch 120. The adhesive tape 130 becomes adhesive when it reacts with the electrolyte. For example, an oriented polystyrene (OPS) film may be used as the adhesive tape 130. The adhesive tape 130, for example, the OPS film, has a tensile strength of about 200 kgf/cm$^2$ or greater, for example, in a range of about 200 kgf/cm$^2$ to about 600 kgf/cm$^2$, which is sufficient to allow the adhesive tape 130 to withstand the pressure applied thereto when the secondary battery 100 is charged and discharged. If the tensile strength of the OPS film is equal to or greater than about 600 kgf/cm$^2$, the adhesive tape 130 is not easily peeled off from the electrode assembly 110, which may cause reduced workability or tearing of the OPS film, thereby creating a defect during the manufacturing process.

The adhesive tape 130 includes a first adhesive tape 131 attached at a top end of the electrode assembly 110 and a second adhesive tape 132 attached at a bottom end of the electrode assembly 110.

The first adhesive tape 131 is positioned on a top portion of the electrode assembly 110, The first adhesive tape 131 extends from the top end P1 up to a spot P2, which corresponds to one-third (⅓) of the entire height of the electrode assembly 110 from the top end P1 thereof (e.g., the first adhesive tape 131 covers the upper one-third (⅓) of the electrode assembly 110). In addition, the first adhesive tape 131 exposes (e.g., does not cover or extend to) one side of the electrode assembly 110, allowing the secondary battery 100 to swell without resistance from the first adhesive tape 131. The first adhesive tape 131 may expose the first round portion S11 of the electrode assembly 110.

The second adhesive tape 132 is positioned on a bottom portion of the electrode assembly 110. The second adhesive tape 132 extends from the bottom end P4 of the electrode assembly 110 up to a spot P3, which corresponds to two-third (⅔) of the entire height of the electrode assembly 110 from the top end P1 thereof (e.g., the second adhesive tape 132 covers the lower one-third (⅓) of the electrode assembly 110). In addition, the second adhesive tape 132 exposes (e.g., does not cover or extend onto) the first round portion S11 of the electrode assembly 110, similar to the first adhesive tape 131.

The strength reinforcing tape 140 is attached to (e.g., wraps around) the outer surface of the electrode assembly 110. The strength reinforcing tape 140 increases the strength of the electrode assembly 110. During a collision test for evaluating the performance of the secondary battery 100, the strength reinforcing tape 140 increases the strength of the electrode assembly 110 and absorbs energy from an impact applied to the secondary battery 100, thereby improving the collision safety of the secondary battery 100.

The strength reinforcing tape 140 is formed of a high-strength film. For example, a polyimide (PI) film may be used as the strength reinforcing tape 140. The strength reinforcing tape 140 is on (e.g., extends across) a central portion of the electrode assembly 110. For example, the strength reinforcing tape 140 extends between the spot P2 and the spot P3. That is to say, the strength reinforcing tape 140 is positioned between the first adhesive tape 131 and the second adhesive tape 132. In addition, the strength reinforcing tape 140 exposes (e.g., does not cover or extend onto) the first round portion S11 of the electrode assembly 110, similar to the first and second adhesive tapes 131 and 132.

As described above, in the secondary battery 100 according to an embodiment of the present invention, the adhesive tape 130 reacts with the electrolyte to become adhesive and to adhere to the top and bottom portions of the electrode assembly 110 to prevent or substantially reduce movement of the electrode assembly 110 within the pouch 120, thereby improving the drop safety of the secondary battery 100.

In addition, in the secondary battery 100 according to an embodiment of the present invention, the strength reinforcing tape 140 is attached to the central portion of the electrode assembly 110 to improve the strength of the electrode assembly 110, thereby improving the collision safety of the secondary battery 100.

FIGS. 5-10 are cross-sectional views illustrating electrode assemblies having adhesive tapes according to various embodiments of the present invention.

While only an adhesive tape attached to an electrode assembly is illustrated in FIGS. 5-10, a strength reinforcing tape is also attached to the electrode assemblies at the same or substantially the same position as (e.g., in line with) the adhesive tape. Therefore, the following description may focus on the position of the adhesive tape.

Figure 5:
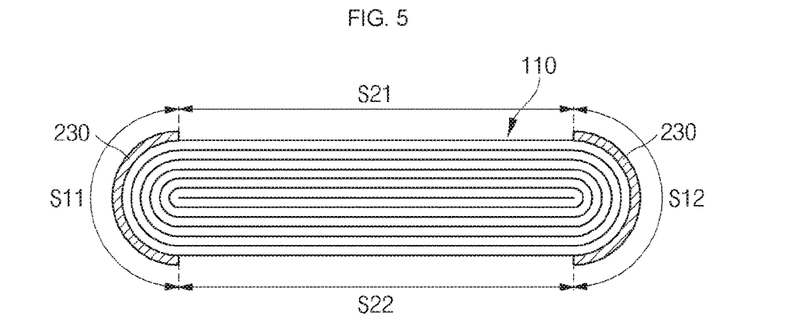
FIGS. 5-10 are cross-sectional views, similar to FIG. 4, illustrating electrode assemblies having adhesive tapes according to various embodiments of the present invention.

Referring to FIG. 5, an adhesive tape 230 according to another embodiment of the present invention is on round portions S11 and S12 of the electrode assembly 110. For example, the adhesive tape 230 is attached to the first round portion S11 and the second round portion S12 of the electrode assembly 110. Accordingly, planar portions S21 and S22 of the electrode assembly 110 are exposed (e.g., are not covered by the adhesive tape 230).

As described above, when the adhesive tape 230 is only on the round portions S11 and S12 of the electrode assembly 110, the adhesive tape 230 does not resist or substantially resist swelling of the electrode assembly 110 because the swelling usually occurs at the planar portions S21 and S22 rather than at the round portions S11 and S12.

Figure 6:
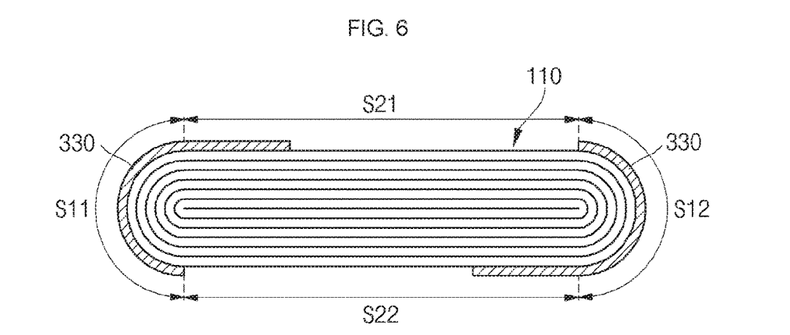

Referring to FIG. 6, an adhesive tape 330 according to another embodiment of the present invention is on opposite round portions S11 and S12 of the electrode assembly 110, and one side of the adhesive tape 330 extends onto (e.g., extends partially onto) the planar portions S21 and S22 of the electrode assembly 110. For example, the adhesive tape 330 is applied such that one side thereof extends onto the first planar portion S21 while wrapping around the first round portion S11 of the electrode assembly 110. In addition, the adhesive tape 330 is on the second round portion S12 and one side thereof extends onto the second planar portion S22. In this embodiment, the adhesive tape 330 extends onto the planar portions S21 and S22 such that it covers only portions of (e.g., less than all of) the first and second planar portions S21 and S22. In addition, the adhesive tape 330 applied at opposite sides of the electrode assembly 110 may be asymmetric.

Figure 7:
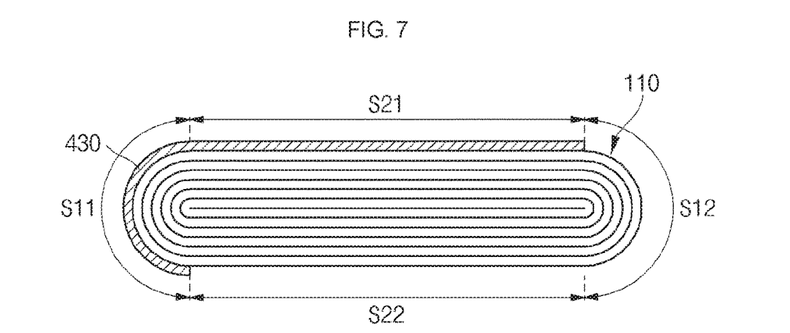

Referring to FIG. 7, an adhesive tape 430 according to another embodiment of the present invention is on the first round portion S11 of an electrode assembly 110 and one side thereof extends onto the first planar portion S21 of the electrode assembly 110. In this embodiment, the adhesive tape 430 entirely covers only the first planar portion S21 and the first round portion S11 of the electrode assembly 110. That is to say, the adhesive tape 430 wraps around the first round portion S11 and covers the first planar portion S21.

Figure 8:
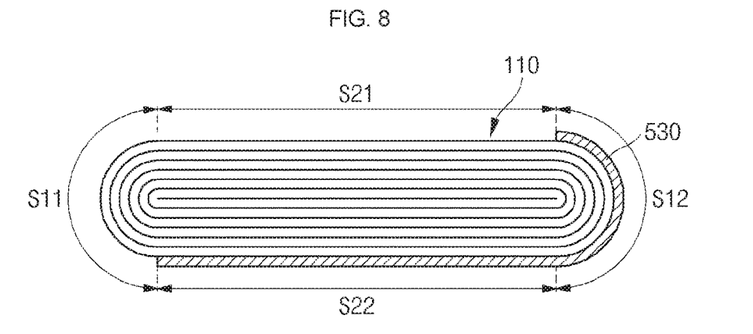

Referring to FIG. 8, an adhesive tape 530 according to another embodiment of the present invention is applied to the opposite portions of the electrode assembly 110 as the adhesive tape 430 shown in FIG. 7. For example, the adhesive tape 530 wraps around the second round portion S12 and covers the second planar portion S22.

Figure 9:
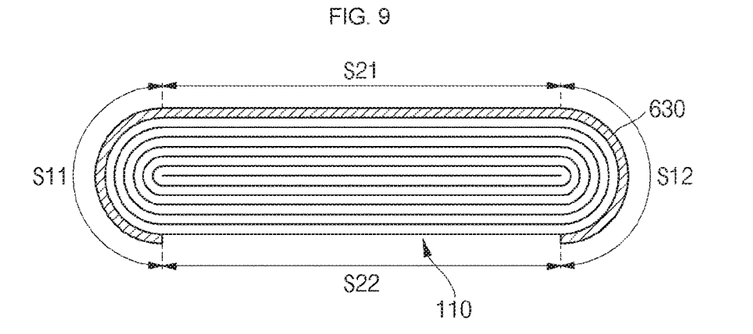

Referring to FIG. 9, an adhesive tape 630 according to another embodiment of the present invention is on the first round portion S11 of the electrode assembly 110 and one side thereof extends onto the first planar portion S21 and onto the second round portion S12, That is to say, the adhesive tape 630 covers all of the portions of the electrode assembly 110 (e.g., each of the first round portion S11, the second round portion S12, and the first planar portion S21), except for the second planar portion S22. However, in another embodiment, the adhesive tape 630 may cover all of portions of the electrode assembly 110, except for the first planar portion S21.

Figure 10:
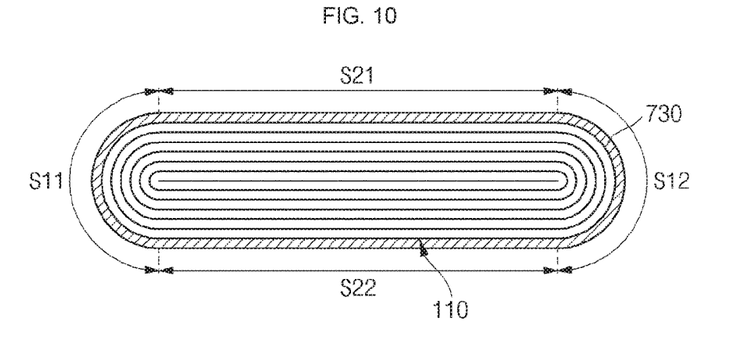

Referring to FIG. 10, an adhesive tape 730 according to another embodiment of the present invention entirely wraps around the outer surface of the electrode assembly 110. That is to say, the adhesive tape 730 covers first and second round portions S11 and S12 and first and second planar portions S21 and S22 of the electrode assembly 110.

While the secondary battery of the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A secondary battery comprising:
a wound electrode assembly comprising a first electrode plate, a second electrode plate, and a separator between the first electrode plate and the second electrode plate, the electrode assembly having a first planar portion, a second planar portion, a first round portion, and a second round portion, the first and second round portions extending between the first and second planar portions;
a pouch accommodating the electrode assembly; and
a first adhesive tape and a second adhesive tape on an outer surface at the first planar portion and the second round portion of the electrode assembly and not covering at least one of the second planar portion and the first round portion of the electrode assembly, the first and second adhesive tapes having adhesiveness through reaction with an electrolyte and being separate from each other,
wherein the first adhesive tape extends from a top end of the electrode assembly toward a bottom end of the electrode assembly, and
wherein the second adhesive tape extends from the bottom end of the electrode assembly toward the top end of the electrode assembly.

2. The secondary battery of claim 1, wherein the first and second adhesive tapes comprise an oriented polystyrene (OPS) film.

3. The secondary battery of claim 1,
wherein the first adhesive tape has a length that is one-third of the entire height of the electrode assembly, and
wherein the second adhesive tape has a length that is one-third of the entire height of the electrode assembly.

4. The secondary battery of claim 3, further comprising a strength reinforcing tape on the electrode assembly between the first adhesive tape and the second adhesive tape,
wherein the strength reinforcing tape comprises a polyimide (PI) film.

5. The secondary battery of claim 1, wherein areas of each of the first and second planar portions being greater than areas of each of the first and second round portions.

6. The secondary battery of claim 5, wherein the first and second adhesive tapes are on the first planar portion, the second round portion, and the second planar portion, and
wherein the first round portion is not covered by the first and second adhesive tapes.

7. The secondary battery of claim 5, wherein the first and second adhesive tapes are on the first round portion and the second round portion, and
wherein at least one of the first planar portion and the second planar portion is not covered by the first and second adhesive tapes.

8. The secondary battery of claim 5,
wherein the first and second adhesive tapes are on the first round portion and the second round portion, and
wherein the first and second adhesive tapes extend from the first round portion onto the first planar portion and from the second round portion onto the second planar portion.

9. The secondary battery of claim 5, wherein the first and second adhesive tapes are on the first round portion, the first planar portion, and the second round portion, and wherein the second planar portion is not covered by the first and second adhesive tapes.

10. The secondary battery of claim 5, wherein the first and second adhesive tapes are on the first planar portion, the second planar portion, the first round portion, and the second round portion.

\* \* \* \* \*